United States Patent [19]

Asai et al.

[11] Patent Number: 4,629,653

[45] Date of Patent: Dec. 16, 1986

[54] MAGNETIC RECORDING MEDIUM HAVING LAMINATED HEXAGONAL FERRITE PLATELETS

[75] Inventors: Takamitsu Asai; Masaaki Fujiyama; Minoru Kanazawa; Nobuo Aoki, all of Kanagawa, Japan

[73] Assignee: Fuji Photo Film Co., Ltd., Kanagawa, Japan

[21] Appl. No.: 677,407

[22] Filed: Dec. 3, 1984

[30] Foreign Application Priority Data

Dec. 1, 1983 [JP] Japan .................................. 58-227436

[51] Int. Cl.$^4$ ............................................. G11B 5/714
[52] U.S. Cl. .................................... 428/328; 360/131; 427/47; 428/329; 428/694; 428/900
[58] Field of Search ............... 428/328, 329, 644, 500; 360/131; 427/48

[56] References Cited

U.S. PATENT DOCUMENTS

| | | | |
|---|---|---|---|
| 3,023,166 | 2/1962 | Duinker et al. | 428/900 |
| 4,486,496 | 12/1984 | Dezawa et al. | 428/329 |
| 4,511,617 | 4/1985 | Hideyoma et al. | 428/328 |
| 4,520,069 | 5/1985 | Kitamoto et al. | 428/329 |
| 4,544,239 | 10/1985 | Shore et al. | 428/900 |
| 4,552,808 | 11/1985 | Fujiyoma et al. | 428/328 |
| 4,565,726 | 1/1986 | Oguchi et al. | 428/329 |

FOREIGN PATENT DOCUMENTS 2018734 10/1979 United Kingdom ................ 428/329

Primary Examiner—George F. Lesmes
Assistant Examiner—William M. Atkinson
Attorney, Agent, or Firm—Sughrue, Mion, Zinn, Macpeak, and Seas

[57] ABSTRACT

A magnetic recording medium is described, comprising a non-magnetic support having provided thereon a magnetic layer containing ferromagnetic particles and a binder, wherein said ferromagnetic particles have a tabular ratio (table diameter/table thickness) of 2 or more, a table diameter of from 0.01 to 10 μm, and a lamination degree of the magnetic particles in the magnetic layer in a cross-section thereof of 2 or more.

14 Claims, 1 Drawing Figure

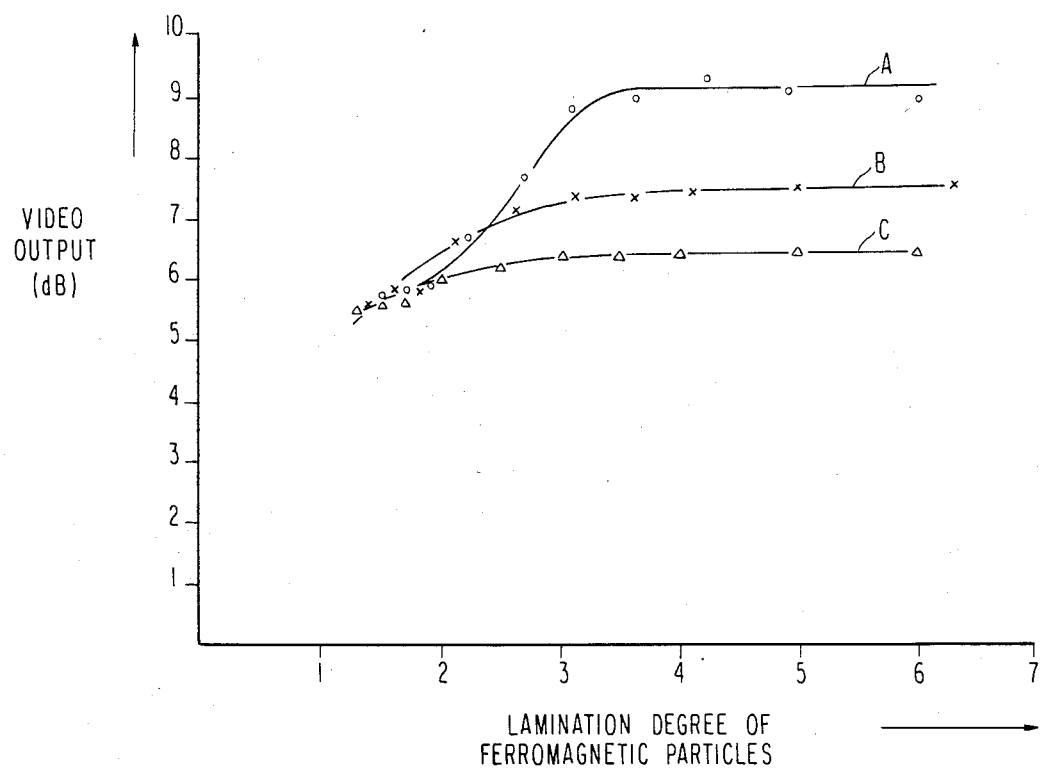

MAGNETIC RECORDING MEDIUM HAVING LAMINATED HEXAGONAL FERRITE PLATELETS

FIELD OF THE INVENTION

The present invention relates to a magnetic recording medium, and more particularly it relates to a magnetic recording medium having an improved video output.

BACKGROUND OF THE INVENTION

A magnetic recording medium comprising a non-magnetic support having coated thereon a coating composition of ferromagnetic particles of acicular crystals such as $\gamma\text{-}Fe_2O_3$ or $CrO_2$ dispersed in a binder, followed by orientation, has widely been used for recording and reproducing.

Recently, it has strongly been desired to improve recording density in order to record large volume of information and to minimize the size of magnetic recording devices. Therefore, it is necessary that the maximum dimension (diameter) of acicular magnetic particles be much smaller than the wavelength to be recorded or the length of a recording bit in order to prepare a recording medium suitable for high density recording using conventional acicular magnetic particles. These days, acicular particles having a dimension (diameter) of 0.3 $\mu$m have been commercially realized and the minimum wavelength typically recorded is about 1 $\mu$m.

It is necessary to further reduce the acicular magnetic particle size, for example, to particles having a diameter of 100 Å or less and having a particle volume of $10^{-17}$ cm$^3$ or less, in order to obtain a medium useful for higher density recording. However, magnetic characteristics deteriorate, because such particles are easily affected by heat and the surface area of the particles becomes smaller, and magnetic orientation is difficult to successfully carry out when a magnetic field is applied to a magnetic layer.

In this connection, a magnetic recording medium containing hexagonal crystallized ferrite having a tabular shape and have an axis of easy magnetization in a direction vertical to its table, which is subjected to magnetic orientation in a machine direction has been found, as disclosed, for example, in Japanese Patent Publication (unexamined) Nos. 6525/83 and 6526/83, and U.S. Pat. No. 4,425,401.

A magnetic recording medium containing hexagonal crystallized ferrite has made it possible to realize high density recording, but there is still a problem in that video output is not sufficient.

SUMMARY OF THE INVENTION

An object of the present invention is to provide a magnetic recording medium having an improved video output for high density recording.

Based on extensive research regarding tabular ferromagnetic particles, it has now been found that video output can be remarkably improved by the use of tabular ferromagnetic particles laminated plurally in a layered form, rather than using particles dispersed independently.

Thus, the object of this invention can be accomplished by a magnetic recording medium comprising a non-magnetic support having provided thereon a magnetic layer containing ferromagnetic particles and a binder, wherein said ferromagnetic particles have a tabular ratio (table diameter/table thickness) of 2 or more, a table diameter of from 0.01 to 10 $\mu$m, and the lamination degree of the magnetic particles in the magnetic layer in a cross-section thereof is 2 or more.

BRIEF DESCRIPTION OF DRAWING

The FIGURE is a graph showing the relationship between the video output of magnetic recording media and the lamination degree of the ferromagnetic particles, wherein:

A illustrates a case of magnetic orientation provided in a transverse direction to the lengthwise direction of a magnetic tape;

B illustrates a case of magnetic orientation provided in a machine direction of a magnetic tape (It is provided in the direction such that the axis of easy magnetization of hexagonal crystallized ferrite is oriented in the lengthwise direction of the magnetic recording medium. The lengthwise direction of the magnetic recording medium corresponds to the coating direction when the magnetic layer is applied on the support.); and C illustrates a case in which magnetic orientation was not provided.

DETAILED DESCRIPTION OF THE INVENTION

The ferromagnetic particles used in the present invention include hexagonal crystallized ferrite particles such as barium ferrite, strontium ferrite, lead ferrite, calcium ferrite and substituted forms thereof or, manganese, bismuth or hexagonal crystallized cobalt alloy. The preferred particles are Co-substituted barium ferrite and Co-substituted strontium ferrite. The ferromagnetic particles used in the present invention have a tabular diameter (average particle diameter) of from 0.01 to 10 $\mu$m, more preferably from 0.03 to 0.10 $\mu$m, and a tabular thickness (average thickness) of from 0.005 to 5 $\mu$m, more preferably from 0.015 to 0.05 $\mu$m.

The tabular ratio (table diameter/table thickness) is 2 or more, and preferably from 3 to 10.

The tabular ferromagnetic particles used in the present invention have a lamination degree of the magnetic particles contained in the magnetic layer in a cross-section thereof of 2 or more, and preferably from 3 to 10.

The lamination degree of the ferromagnetic particles as referred to herein is a value showing how much the tabular ferromagnetic particles are laminated, which is obtained by dividing the number of ferromagnetic particles contained in a cross-section of the magnetic layer by (number of laminated particles + number of particles dispersed independently).

Lamination degree of the ferromagnetic particles =

$$\frac{\text{Number of ferromagnetic particles}}{\text{Number of laminated particles} + \text{Number of particles dispersed independently}}$$

In order to adjust the lamination degree of the ferromagnetic particles to 2 or more, it is preferable to use a dispersing apparatus such as a sand grinder containing beads which is provided with a pump to circulate magnetic particles as well as an apparatus for orientation having magnets fixed in the pump.

That is, tabular ferromagnetic particles are laminated by orientation with magnets and are dispersed by a sand grinder. The lamination degree of the ferromagnetic particles can be adjusted by varying the rotation speed of the sand grinder, the circulation rate, and the magnetic field strength, depending upon the desired tabular ratio and tabular diameter of the ferromagnetic particles to be used.

The rotation speed of the sand grinder is preferably from 1,000 to 2,500 rpm.

If the speed is lower than 1,000 rpm, magnetic particles cannot be well dispersed, and if the speed is higher than 2,500 rpm, beads may be destroyed or the motor may be over-heated. Beads that can be employed in the present invention include glass beads, steel beads, zirconium beads, and ceramics beads, and the preferred shape is a spherical shape or a cylindrical shape having a diameter of 3 mm $\phi$ or less. The number of circulation passes is preferably from 5 to 50.

Magnets used in the present invention can be electromagnets or permanent magnets. The strength of a magnetic field can be adjusted by varying the electric current strength in the case of electromagnets, and by varying the distance between N the pole and the S pole in the case of permanent magnets.

The magnetic field is preferably from 200 to 10,000 Oe (oersted).

The dispersion containing the laminated ferromagnetic particles is coated on a non-magnetic support to obtain a magnetic recording medium.

The relationship between video output of the magnetic recording medium and the lamination degree of the ferromagnetic particles is shown in the FIGURE.

That is, video output becomes higher when two or more ferromagnetic particles are united to form a laminate (lamination degree of ferromagnetic particles: 2 or more). As the lamination degree increases, video output continuous to improve. When the lamination degree reaches a certain value, video output is not improved further. This saturated condition varies depending upon the type of orientation, for example, the case when magnetic orientation is not provided is shown in Curve C, the case when magnetic orientation is provided in the machine direction of the tape as shown in Curve B, and the case when magnetic orientation is provided in the transverse direction of the tape as shown in Curve A. As magnetic orientation is provided more intensively, video output is further improved. Binders, dispersing agents, lubricating agents, or abrasive agents which are to be added to the magnetic coating composition can be added prior to or during the dispersion of the magnetic particles.

The binders used in the present invention are conventionally known thermoplastic resins, thermosetting resins, reactive type resins or a mixture thereof.

Thermoplastic resins which are preferably used in the present invention are those having a softening temperature of 150° C. or less, an average molecular weight of from 10,000 to 200,000, and a polymerization degree of from about 200 to 2,000. Typical examples of the thermoplastic resins are copolymers of vinyl chloride and vinyl acetate, copolymers of vinyl chloride and vinylidene chloride, copolymers of vinyl chloride and acrylonitrile, copolymers of an acrylate and acrylonitrile, copolymers of an acrylate and vinylidene chloride, copolymers or an acrylate and styrene, copolymers of a methacrylate and acrylonitrile, copolymers of a methacrylate and vinylidene chloride, copolymers of a methacrylate and styrene, urethane elastomers, polyvinyl fluoride, copolymers of vinylidene chloride and acrylonitrile, copolymers of butadiene and acrylonitrile, a polyamide resin, polyvinyl butyral, cellulose derivatives (cellulose acetate butyrate, cellulose diacetate, cellulose triacetate, cellulose propionate, nitrocellulose and the like), copolymers of styrene and butadiene, polyester resins, various synthetic rubber type thermoplastic resins (polybutadiene, polychloroprene, polyisoprene, copolymers of styrene and butadiene and the like) and mixtures thereof.

The thermosetting resins or reactive type resins which are preferably used in the present invention have a molecular weight of 200,000 or less in the coating composition. After the coating composition is coated and dried, the molecular weight of these resins becomes infinite by a reaction such as a condensation or addition reaction. Of the above described resins, resins that are not softened or melted until they are heat-decomposed are preferred. Specific examples of those resins are (novolak) phenol and formaldehyde resins, (resol) phenol and formaldehyde resins, phenol and furfural resin, xylene and formaldehyde resins, urea resins, melamine resins, dry oil modified alkyd resins, phenol modified alkyd resins, maleic acid resins modified alkyd resins, unsaturated polyester resins, a mixture of epoxy resins and hardening agents (examples of hardening agents include polyamines, acid anhydrides, polyamide resins and the like), polyester resins having an isocyanate group at the end of the molecule curable with water, polyether resins having an isocyanate group at the end of the molecule which are curable with water, a polyisocyanate prepolymer (a compound having at least three isocyanate groups in its molecule which is obtained by the reaction of diisocyanates and a low molecular weight triol, a trimer of diisocyanates, and a tetramer of diisocyanates), a mixture of a polyisocyanate prepolymer and a resin containing active hydrogen (examples of resins having active hydrogen include a polyester polyol, a polyether polyol, copolymers of acrylate, copolymers of maleic acid, copolymers of 2-hydroxyethyl methacrylate, copolymers of parahydroxystyrene and the like) and mixture thereof.

These binders can be used alone or in combination and other additives can be added thereto. The mixing range of the binder is generally from 8 to 400 parts by weight, and preferably from 10 to 200 parts by weight, per 100 parts by weight of ferromagnetic particles.

Additives that may be used include dispersing agents, lubricating agents, abrasive agents, and the like.

The dispersing agents include a fatty acid having from 12 to 18 carbon atoms ($R_1$COOH, wherein $R_1$ is an alkyl group having from 11 to 17 carbon atoms or an alkenyl group having from 11 to 17 carbon atoms) such as caprylic acid, capric acid, lauric acid, myristic acid, palmitic acid, stearic acid, oleic acid, elaidic acid, linolic acid, linolenic acid or stearolic acid; a metal soap of an alkali metal (e.g., Li, Na, K and the like) or an alkaline earth metal (e.g., Mg, Ca, Ba) of the fatty acid; an amide of the fatty acid, a polyalkylene oxide alkyl phosphate; lecithin; a trialkyl polyolefin oxyquaternary ammonium salt (alkyl groups having from 1 to 5 carbon atom and an olefin such as ethylene, propylene, and the like). Additionally, higher alcohols having 12 or more carbon atoms and a sulfate can be used. Those dispersing agents can be used in an amount of from 0.5 to 20 parts by weight based on 100 parts by weight of binder.

The lubricating agents used in the present invention include silicone oils, such as a dialkyl polysiloxane (alkyl groups having from 1 to 5 carbon atoms), a dialkoxy polysiloxane (an alkoxy group having from 1 to 4 carbon atoms), a monoalkyl monoalkoxy polysiloxane alkyls grop having from 1 to 5 carbon atom an alkoxy group having from 1 to 4 carbon atoms), a phenyl polysiloxane, a fluoroalkyl polysiloxane (alkyl groups having from 1 to 5 carbon atoms); electroconductive particles such as graphite; inorganic particles such as molybdenum disulfide or tungsten disulfide; plastic particles such as polyethylene, polypropylene, copolymers of polyethylene and vinyl chloride or polytetrafluoroethylene; polymerized α-olefin compounds; an unsaturated aliphatic hydrocarbon which is liquid at normal temperature (a compound having an n-olefin double bond at the end of its chain having about 20 carbon atoms); a fatty acid ester consisting of a monobasic fatty acid having from 12 to 20 carbon atom and a monovalent alcohol having from 3 to 12 carbon atoms, and a fluorocarbon. These lubricating agents can be used in an amount of from 0.2 to 30 parts by weight based on 100 parts by weight of the binder.

The abrasive agents are those generally used such as a fused alumina, silicon carbide, chrome oxide ($Cr_2O_3$), corundum, artificial corundum, diamond, artificial diamond, garnet and emery (main components: corundum and magnetite) and the like. These abrasive agents have a Mohs hardness of 5 or more and, an average particle size of from 0.05 to 5 μm, preferably 0.1 to 2 μm. These abrasive agents can be used in an amount of 0.5 to 20 parts by weight based on 100 parts by weight of the binder.

The magnetic recording medium of the present invention can be prepared using the materials and the methods as disclosed in Japanese Patent Publication (examined) No. 26890/81 (corresponding to U.S. Pat. No. 4,135,016).

The present invention is illustrated in more detail by the following Example. In the Example, all parts are by weight.

EXAMPLE

| | |
|---|---|
| Co-substituted Ba ferrite (tabular particle; average particle diameter 0.1 μm, tabular ratio 3.3, average thickness 0.03 μm, coercive force 660 Oe) | 300 parts |
| Graphite particle | 15 parts |
| Copolymer of vinyl chloride and vinylidene chloride (copolymerization ratio 80:20, molecular weight 45,000) | 45 parts |
| Amyl stearate | 10 parts |
| Lecithin | 3 parts |
| Chrome oxide ($Cr_2O_3$) | 5 parts |
| Methyl ethyl ketone | 300 parts |
| Toluene | 300 parts |

The above composition was mixed and dispersed by a sand grainder while being circulated.

Various dispersions were prepared varying the rotation number of the sand grinder, the circulation time and the strength of the magnetic field. The results are shown in Table 1.

TABLE 1

| Kind of Dispersions | No. 1 | No. 2 | No. 3 | No. 4 | No. 5 | No. 6 | No. 7 | No. 8 | No. 9 | No. 10 |
|---|---|---|---|---|---|---|---|---|---|---|
| Strength of magnetic field (Oe) | 0 | 0 | 0 | 500 | 1,000 | 1,000 | 2,000 | 2,000 | 3,000 | 3,000 |
| Circulation time (passes) | 40 | 30 | 25 | 25 | 25 | 25 | 25 | 25 | 20 | 15 |
| Rotation number of sand grinder (rpm) | 2,000 | 2,000 | 2,000 | 2,000 | 2,000 | 1,800 | 1,800 | 1,600 | 1,600 | 1,600 |

To the thus-prepared dispersions were added 50 parts of polyester polyol, followed by homogeneous mixing, then 30 parts of polyisocyanate were added thereto, followed by mixing and dispersing the dispersions by a sand grinder to prepare a hardenable magnetic coating composition.

The hardenable magnetic coating composition was coated with a gravure roll to have a dry thickness of 4 μm on a polyethylene terephthalate film having a thickness of 25 μm and which had been subjected to corona discharge treatment. The thus-obtained magnetic webs were subjected to the following treatments A, B, and C, respectively, and then dried.

A: Magnetic orientation was provided with a magnetic field of 3,800 Oe in the direction transverse to the lengthwise direction of the magnetic web.
B: Magnetic orientation was provided with a magnetic field of 2,000 Oe in the machine direction of the magnetic web.
C: No magnetic orientation was provided.

The magnetic webs were subjected to a calendering treatment and slit to obtain magnetic tapes.

By the combination of the dispersions Nos. 1 to 10 shown in Table 1 and the kinds of treatments A, B and C as described above, tapes were identified as 1A, 1B, 1C, 2A, 2B, etc., through 10A, 10B, and 10C as shown in Tables 2, 3 and 4.

Regarding these tapes, the relationship between the lamination degree of the ferromagnetic particles and video output is shown in Tables 2, 3, and 4.

TABLE 2

| | Tape No. | | | | | | | | | |
|---|---|---|---|---|---|---|---|---|---|---|
| | 1A | 2A | 3A | 4A | 5A | 6A | 7A | 8A | 9A | 10A |
| Lamination degree of ferromagnetic particles | 1.5 | 1.7 | 1.9 | 2.2 | 2.7 | 3.1 | 3.6 | 4.2 | 4.9 | 6.6 |
| Video output (dB) | +5.7 | +5.8 | +5.9 | +6.7 | +7.7 | +8.8 | +9.0 | +9.3 | +9.1 | +9.0 |

TABLE 3

| | Tape No. | | | | | | | | | |
|---|---|---|---|---|---|---|---|---|---|---|
| | 1B | 2B | 3B | 4B | 5B | 6B | 7B | 8B | 9B | 10B |
| Lamination degree of ferromagnetic particles | 1.4 | 1.6 | 1.8 | 2.1 | 2.6 | 3.1 | 3.6 | 4.1 | 5.0 | 6.3 |
| Video output (dB) | +5.6 | +5.8 | +5.8 | +6.6 | +7.2 | +7.4 | +7.4 | +7.5 | +7.6 | +7.6 |

TABLE 4

| | Tape No. | | | | | | | | | |
|---|---|---|---|---|---|---|---|---|---|---|
| | 1C | 2C | 3C | 4C | 5C | 6C | 7C | 8C | 9C | 10C |
| Lamination degree of ferromagnetic particles | 1.3 | 1.5 | 1.7 | 2.0 | 2.5 | 3.0 | 3.5 | 4.0 | 5.0 | 6.0 |
| Video output (dB) | +5.5 | +5.6 | +5.6 | +6.0 | +6.2 | +6.4 | +6.4 | +6.4 | +6.5 | +6.5 |

The lamination degree and video output were measured in the following manner.

(a) Lamination Degree of Ferromagnetic Particles

This is the number of ferromagnetic particles/[number of laminated particles+number of single particles dispersed independently], that is, the ratio thereof calculated by taking a picture of the cross-section of a magnetic tape using an electron microscope (×50,000), counting the number of ferromagnetic particles (about 1,000) contained in the cross-section of the magnetic layer, and within the number thereof, counting the number of laminates and the number of single particles dispersed independently.

(b) Video Output

Video output is measured at a frequency of 6 MHz using a VHS VTR apparatus (2 hours mode) (NV-8800 manufactured by Matsushita Electric Industrial Co., Ltd.) and is a relative value to the value of a VHS regular tape (VHS regular tape T-120E manufactured by Fuji Photo Film Co., Ltd.).

The relationship between the lamination degree of the ferromagnetic particles and the video output as shown in Tables 2 through 4 is shown in the FIGURE.

As is clear from the FIGURE, video output was improved when the lamination degree of the ferromagnetic particles was 2 or more, and it was remarkably improved when the lamination degree was 3 or more.

When the lamination degree is high, the video output is improved even when magnetic orientation is not provided, the video output is more improved when orientation is provided in the machine direction, and it is further more improved when the orientation is provided in a direction transverse to the lengthwise direction of the tapes.

While the invention has been described in detail and with reference to specific embodiments thereof, it will be apparent to one skilled in the art that various changes and modifications can be made therein without departing from the spirit and scope thereof.

What is claimed is:

1. A magnetic recording medium comprising a nonmagnetic support having provided thereon a magnetic layer consisting essentially of hexagonal crystallized ferrite platelets having a tabular shape and having an axis of easy magnetization in a direction vertical to the table of the ferrite platelets and a binder, wherein said ferromagnetic platelets have a table diameter/table thickness ratio of 2 or more, a table diameter of from 0.01 to 10 μm, and the lamination degree of the magnetic platelets in the magnetic layer in a cross-section thereof is 2 or more.

2. A magnetic recording medium as in claim 1, wherein the table diameter is from 0.03 to 0.10 μm.

3. A magnetic recording medium as in claim 1, wherein the lamination degree is from 3 to 10.

4. A magnetic recording medium as in claim 1, wherein said ferromagnetic platelets have a tabular thickness (average thickness) of from 0.005 to 5 μm.

5. A magnetic recording medium as in claim 1, wherein said ferromagnetic platelets have a tabular thickness (average thickness) of from 0.015 to 0.05 μm.

6. A magnetic recording medium as in claim 1, wherein the mixing range of the binder is from 8 to 400 parts by weight per 100 parts by weight of ferromagnetic platelets.

7. A magnetic recording medium as in claim 6 wherein the mixing range of the binder is from 10 to 200 parts by weight per 100 parts by weight of ferromagnetic platelets.

8. A magnetic recording medium as in claim 1, wherein the table diameter/table thickness ratio is from 3 to 10.

9. A magnetic recording medium as in claim 8 wherein the lamination degree is from 3 to 10.

10. A magnetic recording medium as in claim 8, wherein the table diameter is from 0.03 to 0.10 μm.

11. A magnetic recording medium as in claim 10, wherein the lamination degree is from 3 to 10.

12. A magnetic recording medium comprising a nonmagnetic support having provided thereon a magnetic layer containing hexagonal crystallized ferrite platelets having a tabular shape and having an axis of easy magnetization in a direction vertical to the table of the ferrite platelets and a binder, wherein said ferromagnetic platelets have a table diameter/table thickness ratio of from 3 to 10, a table diameter of from 0.03 to 0.10 μm, a tabular thickness (average thickness) of from 0.15 to 0.05 μm, and the lamination degree of the magnetic platelets in the magnetic layer in a cross section thereof is from 3 to 10.

13. A magnetic recording medium as in claim 12, wherein the mixing range of the binder is from 8 to 400 parts by weight per 100 parts by weight of ferromagnetic platelets.

14. A magnetic recording medium as in claim 13, wherein the mixing range of the binder is from 10 to 200 parts by weight per 100 parts by weight of ferromagnetic platelets.

* * * * *